United States Patent [19]

Bleher et al.

[11] Patent Number: 4,866,651

[45] Date of Patent: Sep. 12, 1989

[54] METHOD AND CIRCUIT ARRANGEMENT FOR ADDING FLOATING POINT NUMBERS

[75] Inventors: J. Hartmut Bleher, Nuertigen; Axel T. Gerlicher, Weil im Schoenbuch; Siegfried M. Rump, Ammerbuch; Dieter K. Unkauf, Boeblingen, all of Fed. Rep. of Germany

[73] Assignee: International Business Machines Corp., Armonk, N.Y.

[21] Appl. No.: 89,649

[22] Filed: Aug. 26, 1987

[30] Foreign Application Priority Data

Oct. 31, 1986 [DE] Fed. Rep. of Germany ..... 86115152

[51] Int. Cl.$^4$ .............................................. G06F 7/38
[52] U.S. Cl. .................................... 364/748; 364/751
[58] Field of Search ................ 364/748, 736, 745, 751

[56] References Cited

U.S. PATENT DOCUMENTS 4,644,490 2/1987 Kobayashi et al. ................ 364/748

OTHER PUBLICATIONS

IBM Journal of Research and Development, vol. 11, No. 1, 1/67, pp. 34–53, New York, U.S., S. F. Anderson et al.: "The IBM System/360 Model 91: Floating-point Execution Unit", FIG. 3 and text.
Communications of the ACM, vol. 14, No. 11, 11/71, pp. 731–736, New York, U.S., M. A. Malcolm: "On Accurate Floating-point Summation", paragraph: Extended Summation with Cascading Accumulators.
Communications of the ACM, vol. 7, No. 6, 6/64, pp. 355–356, New York, U.S. J. M. Wolfe: "Reducing Truncation Errors by Programming", entire document.
Mini-Micro Conference Record, 5/84, pp. 10/1(1)–10/1(10), Northeast, New York, U.S.; Nusra Lodhi et al: "System Solutions for a High-Speed Processor Using Innovative ICs", FIG. 10 and text.

Primary Examiner—Gene Wan
Attorney, Agent, or Firm—William B. Porter

[57] ABSTRACT

For successively adding a series of floating point numbers, a floating point adder stage (FIG. 2) is used which, in addition to the sum of two floating point operands, emits the remainder, truncated from the smaller operand, as a floating point number. For obtaining an exact sum of the operands, these remainders are summed in the form of intermediate sums. A circuit arrangement for parallel operation comprises series-connected floating point adder stages (FIG. 6), the intermediate sum occurring at the output of each stage and the intermediate remainder being buffered. Remainders are in each case passed on to the next stage, their value decreasing until they are zero. A serially operating arrangement (FIG. 8) comprises a single adder stage (30) and a register stack (34) for buffering the intermediate sums and the final result. A remainder occurring is stored in a remainder register (32) at the output of the adder stage and added to the intermediate sums until the remainder is zero. Subsequently, a fresh operand is applied to the input of the adder stage.

13 Claims, 10 Drawing Sheets

Example 1

| Signal Name | Value (hexadecimal) |
|---|---|
| summand A | B4 80 00 00 00 00 00 02 |
| summand B | 40 A0 00 00 00 00 00 0F |
| char A | 34 |
| char B | 40 |
| char difference | C |
| sign | 1 |
| summand A" | as B |
| sign | 0 |
| char | 40 |
| mantissa | A0 00 00 00 00 00 0F |
| summand B" | as A |
| sign | 1 |
| char | 34 |
| mantissa | 80 00 00 00 00 00 02 |
| char difference | C |
| output VS 8 | 00 00 00 00 00 00 80 |
| output VS 18 | 00 00 00 00 00 02 00 |
| sum, adder 10 | |
| sign | 0 |
| carry | 0 |
| mantissa | 9F FF FF FF FF FF 8F |
| leading zeros, LZD12 shift value sum | 0 |
| sum zero | 0 |
| output VS 14 | 9F FF FF FF FF FF 8F |
| sum digit (60-63) | 0 |
| leading zeros, LZD20 shift value remainder | -B |
| remainder zero | 0 |
| output VS 22 | 20 00 00 00 00 00 00 |
| char adder sum 16 | |
| sum overflow | 0 |
| sum underflow | 0 |
| char sum | 40 |
| sign sum | 0 |
| sum zero | 0 |
| char adder remainder 26 | |
| remainder underflow | 0 |
| char remainder | 27 |
| sign remainder | 1 |
| remainder zero | 0 |
| sum S | 40 9F FF FF FF FF 8F |
| remainder | A7 20 00 00 00 00 00 |

FIG. 3

Example 2

| Signal Name | Value (hexadecimal) |
|---|---|
| summand A | C0 FF FF FF FF FF FF F8 |
| summand B | B3 A1 23 45 67 89 AB CD |
| | |
| char A | 40 |
| char B | 33 |
| char difference | D |
| sign | 0 |
| | |
| summand A" | as A |
| sign | 1 |
| char | 40 |
| mantissa | FF FF FF FF FF FF F8 |
| | |
| summand B" | as B |
| sign | 1 |
| char | 33 |
| mantissa | A1 23 45 67 89 AB CD |
| | |
| char difference | D |
| output VS 8 | 00 00 00 00 00 00 0A |
| output VS 18 | 12 34 56 78 9A BC D0 |
| | |
| sum, adder 10 | |
| sign | 1 |
| carry | 1 |
| mantissa | 00 00 00 00 00 00 02 |
| | |
| leading zeros, LZD12 | |
| shift value sum | 1 |
| sum zero | 0 |
| output VS 14 | 10 00 00 00 00 00 00 |
| | |
| sum digit (60-63) | 2 |
| | |
| leading zeros, LZD20 | |
| shift value remainder | 1 |
| remainder zero | 0 |
| output VS 22 | 21 23 45 67 89 AB CD |
| | |
| char adder sum 16 | |
| sum overflow | 0 |
| sum underflow | 0 |
| char sum | 41 |
| sign sum | 1 |
| sum zero | 0 |
| | |
| char adder remainder 26 | |
| remainder underflow | 0 |
| char remainder | 33 |
| sign remainder | 1 |
| remainder zero | 0 |
| | |
| sum S | C1 10 00 00 00 00 00 00 |
| remainder R | B3 21 23 45 67 89 AB CD |

FIG. 4

Example 3

| Signal Name | Value (hexadecimal) |
|---|---|
| summand A | 40 80 00 00 00 00 00 02 |
| summand B | B0 A0 00 00 00 00 00 0F |
| char A | 40 |
| char B | 30 |
| char difference | E |
| sign | 0 |
| summand A" | as A |
| sign | 0 |
| char | 40 |
| mantissa | 80 00 00 00 00 00 02 |
| summand B" | as B |
| sign | 1 |
| char | 30 |
| mantissa | A0 00 00 00 00 00 0F |
| char difference | E |
| output VS 8 | 00 00 00 00 00 00 00 |
| output VS 18 | A0 00 00 00 00 00 0F |
| sum, adder 10 | |
| sign | 0 |
| carry | 0 |
| mantissa | 80 00 00 00 00 00 02 |
| leading zeros, LZD12 | |
| shift value sum | 0 |
| sum zero | 0 |
| output VS 14 | 80 00 00 00 00 00 02 |
| sum digit (60-63) | 0 |
| leading zeros, LZD20 | |
| shift value remainder | 0 |
| remainder zero | 0 |
| output VS 22 | A0 00 00 00 00 00 0F |
| char adder sum 16 | |
| sum overflow | 0 |
| sum underflow | 0 |
| char sum | 40 |
| sign sum | 0 |
| sum zero | 0 |
| char adder remainder 26 | |
| remainder underflow | 0 |
| char remainder | 30 |
| sign remainder | 1 |
| remainder zero | 0 |
| sum | 40 80 00 00 00 00 02 |
| remainder R | B0 A0 00 00 00 00 0F |

FIG. 5

| Clock | 0 | 1 | 2 | 3 | 4 | 5 | 6 | 7 |
|---|---|---|---|---|---|---|---|---|
| input | +1,234E12 | +2,345E9 | +3,456E6 | +4,567E3 | 0 | | | |
| stage 1 | | | | | | | | |
| opd B | | 1,234E12 | 2,345E9 | 3,456E6 | 4,567E3 | | | |
| opd A | | 0 | 1,234E12 | 1,236E12 | 1,236E12 | 1,236E12 | 1,236E12 | 1,236E12 |
| S1 | | 1,234E12 | 1,236E12 | 1,236E12 | 1,236E12 | 1,236E12 | 1,236E12 | 1,236E12 |
| R1 | | 0 | 3,450E8 | 3,456E6 | 4,567E3 | 0 | 0 | 0 |
| stage 2 | | | | | | | | |
| opd B | | | | 3,450E8 | 3,456E6 | 4,567E3 | 0 | 0 |
| opd A | | | | 0 | 3,450E8 | 3,484E8 | 3,484E8 | 3,484E8 |
| S2 | | | | 3,450E8 | 3,484E8 | 3,484E8 | 3,484E8 | 3,484E8 |
| R2 | | | | 0 | 5,600E4 | 4,567E3 | 0 | 0 |
| stage 3 | | | | | | | | |
| opd B | | | | | 5,600E4 | 4,567E3 | 0 | 0 |
| opd A | | | | | 0 | 5,600E4 | 6,056E4 | 6,056E4 |
| S3 | | | | | 5,600E4 | 6,056E4 | 6,056E4 | 6,056E4 |
| R3 | | | | | 0 | 0 | 7,000E0 | 0 |
| stage 4 | | | | | | | | |
| opd B | | | | | | | 7,000E0 | 0 |
| opd A | | | | | | | 0 | 7,000E0 |
| S4 | | | | | | | 7,000E0 | 7,000E0 |
| R4 | | | | | | | 0 | 0 |

FIG. 7

| Main Clock | Sub-Clock | SMR Addr. | Opd. | B | A | Sum S | Remaind. R | SMR Addr. | Content | Comp. step |
|---|---|---|---|---|---|---|---|---|---|---|
| 1 |   | 0 | 1.234E12 | 1.234E12 | 0 | 1.234E12 | 0 | 0<br>1 | 1.234E12<br>0 | 1 |
| 2 |   | 0 | 2.345E9 | 2.345E9 | 1.234E12 | 1.236E12 | 3.450E8 |   |   | 2 |
|   | 1 | 1 | — | 3.450E8 | 0 | 3.450E8 | 0 | 0<br>1 | 1.236E12<br>0 | 3 |
| 3 |   | 0 | 3.456E6 | 3.456E6 | 1.236E12 | 1.236E12 | 3.456E6 | 0<br>1<br>2 | 1.236E12<br>3.450E8<br>0 | 4 |
|   | 1 | 1 | — | 3.456E6 | 3.450E8 | 3.484E8 | 5.600E4 | 0<br>1<br>2 | 1.236E12<br>3.450E8<br>0 | 5 |
|   | 2 | 2 | — | 5.600E4 | 0 | 5.600E4 | 0 | 0<br>1<br>2 | 1.236E12<br>3.484E8<br>0 | 6 |
|   | 3 |   |   |   |   |   |   | 0<br>1<br>2<br>3 | 1.236E12<br>3.484E8<br>5.600E4<br>0 |   |

FIG. 9A

| Main Clock | Sub-Clock | SMR Addr. | Opd. | B | A | Sum S | Remaind. R | SMR Addr. | SMR Content | Comput-step |
|---|---|---|---|---|---|---|---|---|---|---|
| 4 | | 0 | 4.567E3 | 4.567E3 | 1.236E12 | 1.236E12 | 4.567E3 | 0<br>1<br>2<br>3 | 1.236E12<br>3.484E8<br>5.600E4<br>0 | 7 |
| | 4 | 1 | — | 4.567E3 | 3.484E8 | 3.484E8 | 4.567E3 | 0<br>1<br>2<br>3 | 1.236E12<br>3.484E8<br>5.600E4<br>0 | 8 |
| | 5 | 2 | — | 4.567E3 | 5.600E4 | 6.056E4 | 7.000E0 | 0<br>1<br>2<br>3 | 1.236E12<br>3.484E8<br>6.056E4<br>0 | 9 |
| | 6 | 3 | — | 7.000E0 | 0 | 7.000E0 | 0 | 0<br>1<br>2<br>3<br>4 | 1.236E12<br>3.484E8<br>6.056E4<br>7.000E0<br>0 | 10<br>sum |

FIG. 9B

METHOD AND CIRCUIT ARRANGEMENT FOR ADDING FLOATING POINT NUMBERS

BACKGROUND OF THE INVENTION

1. Field of the Invention

This invention generally relates to mechanisms for performing the addition of numbers stored in "floating point" form. In particular, this invention relates to methods and circuitry for performing floating point addition with minimum loss of precision.

2. Background Information

For adding two floating point numbers, the smaller number must be right-shifted until the exponents of both numbers are equal. The part of the smaller operand not considered during the addition and which after having been shifted out of the predetermined word length may be referred to as remainder is generally either discarded or considered by rounding the least-significant sum digit. This is described, for example, in IBM TDB October 1969, page 683 and IBM TDB October 1984, pages 3138 to 3140.

When several summands are successively added, as, for instance, in vector operations, such rounding or discarded remainders may lead to substantial errors. Relatively small operands, for example, may be erased, although they would have been decisive to the subtraction of two operands of substantially the same magnitude. In practice, the result of a sum thus obtained depends on the arbitrary sequence of additions or subtractions.

For improving the accuracy, it is known to use multiple word lengths or to temporarily extend the mantissa of the floating point sum at the least-significant end by one digit.

From EP-No. B1 79 471 an arrangement is known which permits obtaining an accurate sum of floating point operands. This arrangement uses a hyperlong accumulator with several hundred positions in the usual exponent range (e.g., ±63). In this arrangement, the individual summands are summed in fixed point notation, as one accumulator register is provided for each exponent subarea. Thus, if the exponent matches, the mantissa sum may be stored in the associated accumulator register. The method used in that arrangement necessitates a vast number of carry operations which are the more difficult to implement the longer the accumulator becomes. Such carry operations are highly time-consuming for several hundred positions. The fixed point notation employed also necessitates additional shift operations for matching the sum to the respective accumulator register. For very large exponents, as are provided in future computing standards, the known arrangement could only be realized at extraordinarily high expenditure.

An algorithm ensuring that the approximation for a sum of floating point numbers is as accurate as possible is described in the article by G. Bohlender "Genaue Summation von Gleitkommazahlen" in "Computing", Suppl. 1, 1977, pp. 21 to 32. According to this algorithm, the remainders produced by the individual summations are stored. After all operands have been summed, the remainders are added to the operand sum in a large number of successive cycles. The described algorithm is aimed at obtaining an accurately rounded floating point number for the sum. The described method has the disadvantage that it requires much storage space for the remainders and a large number of operations in which the stored remainders are added to the existing sum.

Therefore it is the object of the present invention to provide a method and an arrangement by means of which an accurate result of a sum of floating point numbers may be obtained without elaborate technical means.

SUMMARY OF THE INVENTION

The invention is based on the truncation of the remainder of the smaller operand and its output in normalized floating point notation. This permits processing the remainder in the same floating point adder stages as are used to obtain the mantissa sum of two operands and standardizing the means employed for this purpose, which is favourable for large-scale semiconductor integration. In addition, remainders are immediately processed, leading to time savings. The invention is well suited for existing computer structures. Even for very large exponent ranges, say, about ±5000, as are specified in recent computing standards, the present invention requires only few means, as it is not necessary to provide computer and storage means for the full exponent range straight away, their exact number rather depending on the actual problem to be solved. This leads to a high degree of flexibility, since the storage and computer means are connected as required. The adders used according to the invention have a single length mantissa and thus permit high-speed carry operations.

The parallel operation of the present invention, which provides for the adder stages to be series-connected in pipeline form, permits high speeds at a large number of operands, as quite a number of add operations may be carried out simultaneously with respect to input operands, intermediate sums and remainders.

The serial operation according to the present invention permits using a simple arrangement comprising a single floating point adder stage. Representation of the sum requires a plurality of storage registers, whose number, being dependent on the respective problem to be solved, is variable. Thus, a reconfiguration of existing equipment is also possible.

BRIEF DESCRIPTION OF THE DRAWINGS

The parallel and sequential operation of the invention is described below with reference to drawings which illustrate only one specific embodiment, in which FIGS. 3 to 5 show three addition examples in the form of tables, FIG. 7 shows an addition example concerning FIG. 6, FIG. 9 shows an addition example (FIGS. 9A and 9B) explaining the operation of the arrangement of FIG. 8.

DESCRIPTION OF THE PREFERRED EMBODIMENT

The addition method is described below with reference to two simple examples. For simplicity, it is assumed that decimal floating point numbers with 4 mantissa digits are used.

In the representation 1.234E3, 1.234 is the digit sequence of the mantissa which by definition is assumed to have a digit other than zero before the decimal point. E3 indicates that the place before the decimal point has the value $10^3$, i.e., the exponent is 3.

1. Addition of 5 floating point numbers:

1.000E9+2.000E7+3.000E5+4.000E3+5.000E1

The exact sum is readily determined by conversion into fixed point notation:

|  |  |
|---|---|
|  | 1 000 000 000 |
|  | 20 000 000 |
|  | 300 000 |
|  | 4 000 |
|  | 50 |
| exact sum = | 1 020 304 050 = 1.020 304 05 E9 |

Conventional floating point addition with 4 mantissa digits yields:

1.020E9 i.e., the remainder of 3.04050E5 is not considered in the result and subsequent calculations, if any.

2. Addition of 6 floating point numbers, leading to erasure or extinction:

| Number | I | II | III | IV | V | VI |
|---|---|---|---|---|---|---|
| 1.000E9+2.000E7+3.000E5+4.000E3+5.000E1−1.020E9 |

The exact sum is again readily determined by conversion into fixed point notation:

|  |  |
|---|---|
|  | 1 000 000 000 |
|  | 20 000 000 |
|  | 300 000 |
|  | 4 000 |
|  | 50 |
|  | − 1 020 000 |
|  | 000 |
| exact sum = | 304 050 = 3.0405 E5 |

Floating point addition with 4 mantissa digits yields:

0.000

This shows that the erasure as illustrated above depends on the arbitrary sequence of the individual summands, because, when numbers III and VI are swapped, the result is 3.040E5 which is already much more accurate than the first (0.000). However, summand 5.000E1 is not considered in this case either.

Therefore, it is essential to have an accurate sum result which is independent of the arbitrary sequence of the individual summands.

Figure 1:
FIG. 1 shows a data format used in the present description.

FIG. 1 shows the data format used in the embodiment described below. The 64 bits of the data word are associated as follows:

bit 0: Sign S of the mantissa. The mantissa is positive if the sign bit is "0".

bits 1 to 7: Characteristic CH of the mantissa. The characteristic is derived from the exponents of the mantissa by addition of the decimal number 64 (hex 40). Thus, the hexadecimal values of the characteristic of 00 to 40 correspond to a decimal exponent of −64 to 0 and the characteristic values hex 41 to hex 7F to a positive exponent of 1 to 63.

The mantissa used below has a zero before the decimal point and its first hexidecimal digit after the point must be other than zero.

Figures 2, 2A:
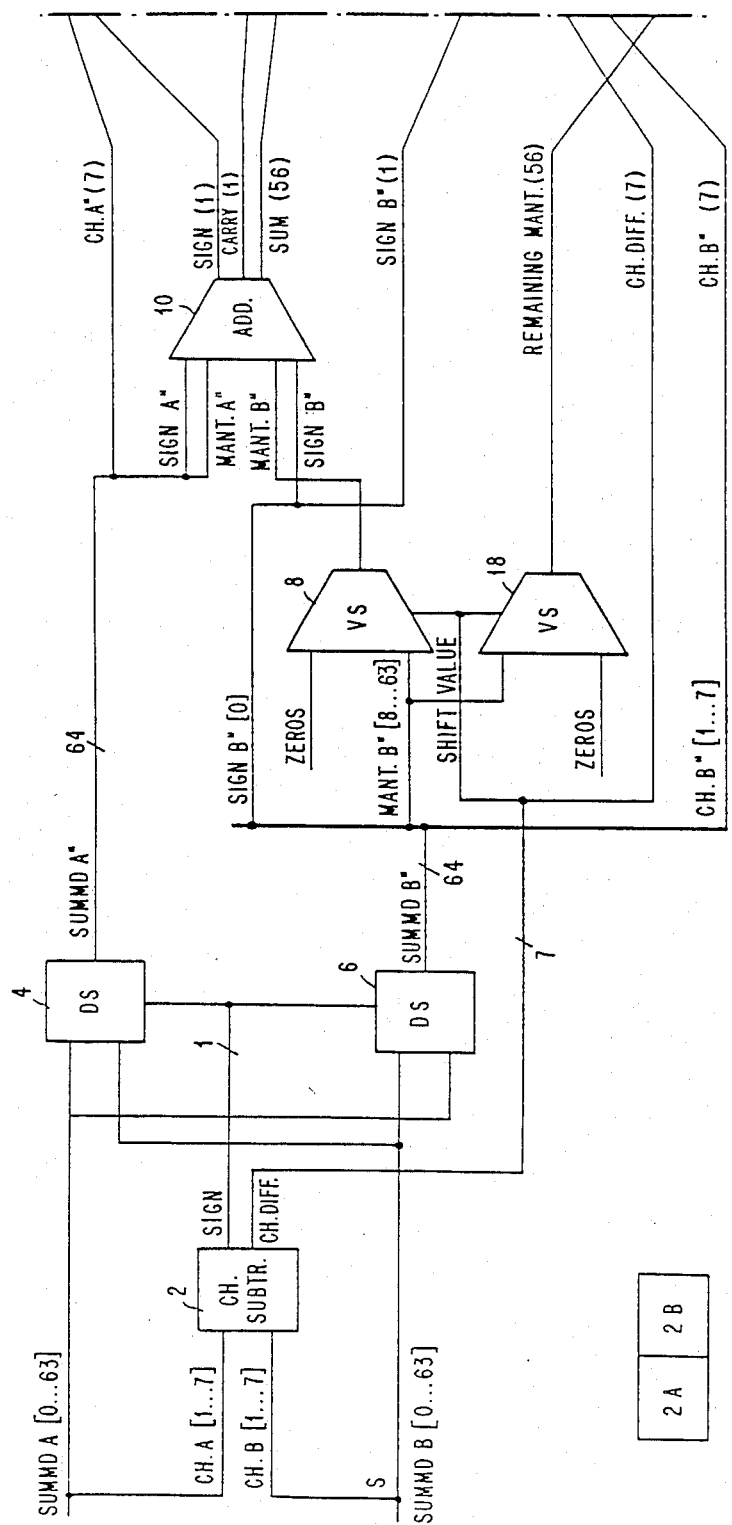
FIG. 2 shows a a floating point adder stage, consisting of FIGS. 2A and 2B, with calculation of the remainder.
Figure 2B:
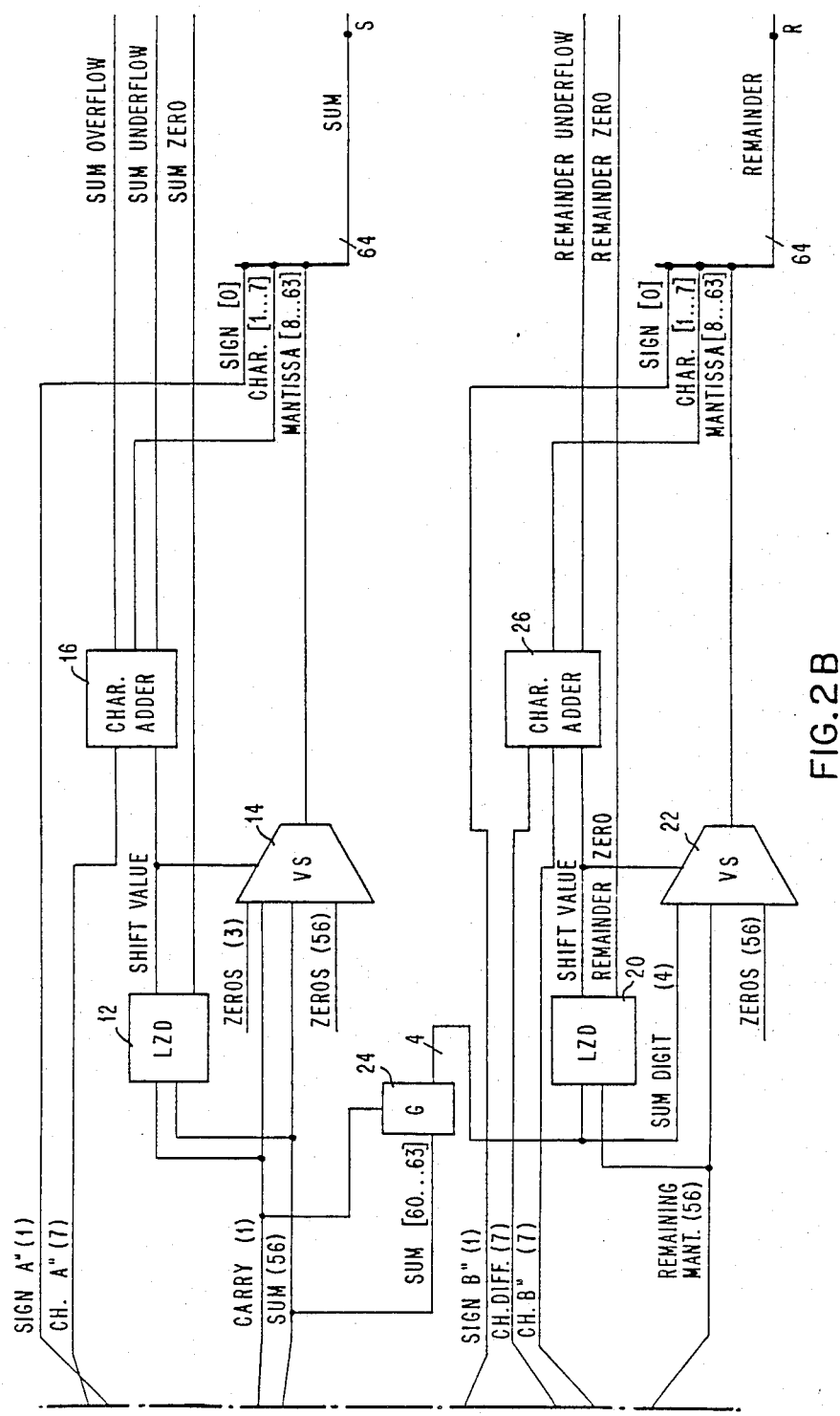

A floating point adder stage according to the invention is shown in FIG. 2 which consists of FIGS. 2A and 2B. In the figure, the numbers in brackets denote the respective bit positions and the numbers in parentheses the number of bits on the respective bus. In some places, this number is also represented by a slash with a number.

The two summands A and B are fed to one data shift means (DS) 4 and 6 each. The characteristics of the two numbers Ch A and Ch B are fed to a characteristic subtracter 2, the output of which emits the characteristic difference and the sign of the subtraction. If Ch A≧Ch B, the two data selectors 4 and 6 are controlled by the sign signal such that summand A is passed by data selector 4 and summand B by data selector 6. Alternatively, the two summands are swapped by the data selector, feeding summand B to the upper bus in FIG. 2A and summand A to the lower bus. In this manner, the larger summand invariably reaches the upper bus where it is designated as A". The summand on the lower bus is designated as B".

For adding two floating point numbers, the mantissa of the smaller number must first be right-shifted such that the two exponents become equal. The digits (remainder) thus shifted out of the computer's mantissa width (14 hexadecimal digits) are lost unless further measures are taken for calculation. The shift is effected by shift means 8, with the magnitude of shift being controlled by the characteristic difference. Shift means 8 is a so-called funnel shifter. The input width of the shifter is 2×56 bits and the output width 1×56 bits. The right shift produces blank digits at the left end, which, as shown in conjunction with shift means 8, have to be filled with zeros. Subsequently, the mantissas of the two summands may be added in mantissa adder 10. For that purpose, mantissa adder 10 also receives the signs of the two mantissas. The sum of the two mantissas, which again has 56 bits, a signal denoting a carry, if any, and a sign signal of the sum are emitted at the output of the mantissa adder. In a connected leading zero detector (LZD) 12, leading hexadecimal zero digits are detected, and by shift means 14 the mantissa is correspondingly left-shifted for normalization. The least-significant places must be filled with zeros, as indicated.

If a carry occurs when the sum is formed in adder 10, the mantissa sum must be right-shifted by one place in shift means 14, to make room for the hexadecimal digit 0001 to be inserted at the left end. For inserting the three zeros into that digit, an input is provided at shift means 14.

If no leading zeros and no carry is detected, the characteristic of the sum equals the characteristic of operand A". Alternatively, the characteristic of the sum must be modified in characteristic adder 16. At the output of the adder stage, the following signals are emitted with respect to the sum:

A sum signal S consisting of 64 bits.

A "sum overflow" signal indicating that the exponent range available has been exceeded and that further calculation without rescaling is impossible.

A "sum underflow" signal indicating that the negative exponent range has been exceeded.

A "sum 0" signal indicating that all digits of the sum are 0. By means of this signal, unnecessary operational steps may be skipped.

According to the invention, the adder stage shown in FIG. 2 may also emit a remainder which similar to FIG. 1 consists of 64 bits. In this connection, three cases may have to be considered with respect to the relative position of the two summands A" and B":

1. The two characteristics of the two summands were originally identical. In this case, the mantissas are fully overlapping and normally there is no remainder. In exceptional cases, i.e., if a sum carry occurs, the sum must be right-shifted by one place so that the least-significant place of the sum is shifted out of the word length and may be processed further as a remainder.

2. The mantissas are partly overlapping. In this case, the overlapping part, i.e., the higher digits of the shifted mantissa B" are added to mantissa A", while the remaining lower digits are processed further as a remainder.

3. The mantissas are not overlapping. In this case, the entire mantissa B" must be truncated as a remainder.

For generating the remainder, a shift means 18 is provided according to the invention, which is designed similar to shift means 8 and which truncates the respective least-significant places of mantissa B" as a remainder. The remaining places of the truncated mantissa B" must then be filled with zeros, as explained in connection with shift means 18. A leading zero detector (LZD) 20, controlling a shift means 22, is also provided for the remaining mantissa. The shift operation in shift means 22 depends, in addition to the number of leading zeros, on whether the sum of the two mantissas A" and B" produced a carry. If so, the sum mantissa must be right-shifted by one place, as previously explained, so that the least-significant place (bits 60–63) of the sum mantissa is shifted out and entered by shift means 22 into the most-significant place of the remaining mantissa. In this case, the remaining mantissa must be right-shifted by 1 place. As a sum carry only occurs with partly overlapping mantissas A" and B", the least-significant place of the remaining mantissa is always zero, so that right-shifting the remaining mantissa by one place is unproblematical. The hexadecimal digit with the bit positions 60–63 shifted out of the sum mantissa at the least-significant place is fed by a gate circuit 24 to shift means 22. Gate circuit 24 passes this digit if the sum carry signal is "1". The digit shifted out of the sum may be zero, so that the associated 4 bits must also be fed to detector 20.

The characteristic of the remainder is calculated in the characteristic adder. It is obtained from $$CH_R = CH_{B''} + SHMT - (E - CH_D)$$

where
$CH_R$ is the characteristic of the remainder,
$CH_{B''}$ is the characteristic of the operand B",
SHMT is the shift value emitted by detector 20,
E is the word length of the mantissa, i.e., in the present example 14 hexadecimal digits (hexadecimal E),
$CH_D$ is the characteristic difference emitted by subtracter 2. As the maximum value of this characteristic is assumed to be 14 by definition, i.e., hex. E, 4 lines at the output of subtracter 2 are sufficient.

The values for SHMT range from 1 to —E. and for CHD from 0 to E.

Thus, the 64 bit long remainder in floating point notation is available at the circuit output (node R).

Similar to the sum, an underflow may be detected for the remainder, which would necessitate rescaling the calculation.

A significant signal is the circuit signal "remainder zero", as explained in detail further on.

FIGS. 3 to 5 show three addition examples in the form of tables so that FIG. 2 may be readily appreciated.

In the first example (FIG. 3) a positive summand B is added to a negative summand A. In the table, the two operands are represented as hexadecimals digits. The two left-most digits of summand A are B4, i.e., 1001 0100. The first, left-most, bit denotes the sign. As this bit has the value "1", summand A is negative. The remaining 7 bits 011 0100, i.e., 34, represent the characteristic.

The first two digits of summand B are 40, i.e., 0100 0000. The first, left-most, bit is 0, denoting that summand B is positive. The characteristic of summand B has the hexadecimal value 40. As the characteristic of B is greater than the characteristic of A, the sign bit at the output of characteristic subtracter 2 is "1", causing the two data selectors 4 and 6 to swap summands. Summand A thus becomes summand B" and summand B summand A", as the greater of the two summands is always fed to the upper bus. The difference between the two characteristics is C (decimal 12). Thus the two least-significant digits of B overlap the two most-significant mantissa digits of A. The remaining 12 digits of A are truncated by shift means 18 as a remainder.

The table also shows the output signals of the remaining units illustrated in FIG. 2. At the end of the table, the signals obtained at output S (for the sum) and R (for the remainder) are shown quite clearly.

In the second example illustrated in FIG. 4, two negative summands are added, the mantissas of which are partly overlapping. This example shows the operation of the circuit if mantissa adder 10 emits a carry signal and the least-significant mantissa digit of the sum must be shifted into the remainder.

In the third example, FIG. 5, a positive summand A is added to a negative summand B. The mantissas of the two operands are not overlapping. The difference between the two characteristics is hexadecimal 10 (decimal 16). As previously described, the characteristic subtracter 2 emits a maximum characteristic difference of E (decimal 14), as the mantissa has only E places. In the characteristic adder 26 for the remainder, this difference value, which is too low, is incremented to the correct difference value. Thus, in this example, the entire summand B is emitted as a remainder.

The arrangement in FIG. 2 is implemented in purely combinatorial logic. It may also be implemented in sequential logic with buffers and repeated use of significant function groups, such as adders, shift means, etc. This substantially reduces the technical means required but also the processing speed.

Figure 6:
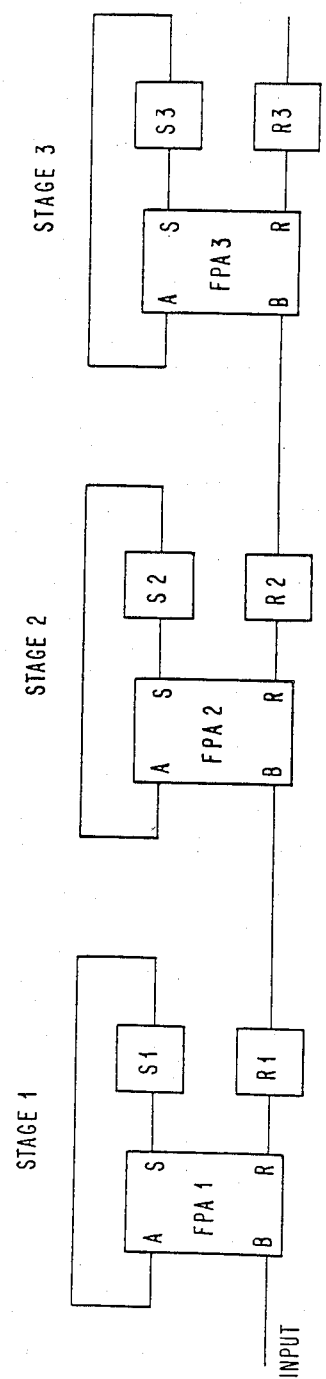
FIG. 6 shows a series connection of floating point adder stages according to FIG. 2 in pipeline form for parallel operation.

FIG. 6 shows three series-connected floating point adder stages FPA1 to FPA3. This number has been chosen arbitrarily, which means that more adder stages FPA may be used, if required, with one adder stage corresponding to the arrangement shown in FIG. 2. The input of this adder stage receives the summands A and B and its output supplies the sum signal S and the remainder signal R.

Between two adder stages, the arrangement of FIG. 6 also comprises a register pair for storing the sum and the remainder signal. The operands to be summed are successively applied to the input of the circuit. The arrangement of FIG. 6 may be used, for example, for vector operations in which a plurality of operands are successively summed. Before a fresh operand is applied, the registers are clocked for the receipt of the fresh value. To avoid instabilities, the registers must either be edge-controlled or be made up of master-slave flip-flops.

At the next clock, the sum signal generated in the illustrated pipeline arrangement is returned to the A input of the same stage, while the generated remainder signal is fed to the B input of the subsequent stage. In this manner, remainders produced in a particular stage and which cannot be processed therein, continue to be shifted in the pipeline arrangement, becoming smaller and smaller. After there are no further operands left, these remainders are processed until finally all remainder registers are zero. The "remainder zero" signal of the leading zero detector 20 shown in FIG. 2B, thus allows determining the time at which all summands have been summed and the exact result is available in the sum registers. The number of floating point adder stages required depends on the respective problem to be solved. Tests have shown that a relatively small number of stages are sufficient for solving a high percentage of the arithmetic problems occurring in practice. The number of stages required depends on the length of the mantissa and declines with increasing mantissa lengths. For the usual mantissa lengths of 52-56 bits (64 bit word length) 4 to 5 stages are sufficient for most of the problems occurring in practice.

FIG. 7 shows a computing example in the form of a table so that FIG. 6 may be more readily appreciated. For simplicity, it is assumed that all summands are positive and the digits are in decimal notation. It is assumed that there are four operands to be added $$1.234E12 + 2.345E9 + 3.456E6 + 4.567E3.$$

As shown in the table, at the first four clocks 0-3, these four operands are successively applied to the input of the circuit. At the first clock, the first summand appears at input B of stage 1. (Transmission of the individual operands, sums or remainders is marked by small arrows in FIG. 7). As no signal is applied to input A of that stage, operand B is the larger one and stored in sum register S1. At the second clock, the first operand is added to the second operand in stage 1. The operands are partly overlapping, namely, with respect to the last decimal digits of the first operand. The result is stored in sum register S1 and the remainder occurring, i.e., the part truncated from operand B supplemented by a zero at the least-significant place in remainder register R1. At the third clock, this remainder is fed to input B of stage 2 and, having passed that stage, is stored in sum register S2. In the same stage 1, the third operand is simultaneously added to the content of register S1, which again produces a remainder. This remainder is stored in remainder register R1 and fed to input B of stage 2 at clock 4. As the sum register S2 in stage 2 already contained a value other than zero, an addition is carried out in that stage, storing the result in sum register S1 and the remainder in remainder register R2. As indicated by the arrows, each new clock causes the value stored in the sum register of a stage to be applied to input A of that stage, while a stored remainder, if any, is applied to input B of the next stage. According to the operation shown in FIG. 2, in each stage the larger operand incremented by the overlapping part of the smaller operand is fed to the sum register.

As shown in FIG. 7, the arithmetic operation terminates at clock 7; no further operands are applied and all remainder registers R1 to R4 are zero. The "remainder zero" output signal of each adder stage supplies a binary one, which may be readily detected by an AND circuit, and the arithmetic operation terminates. The exact result $$1.236E12 + 3.484E8 + 6.056E4 + 7.0000E0$$

is in sum registers S1 to S4. The chronological implementation of the computing method poses no problems, so that a representation of a suitable sequence control has been omitted, particularly since it has previously been explained in detail by way of examples which operations have to be performed in the individual phases of the computation process.

Figure 8:
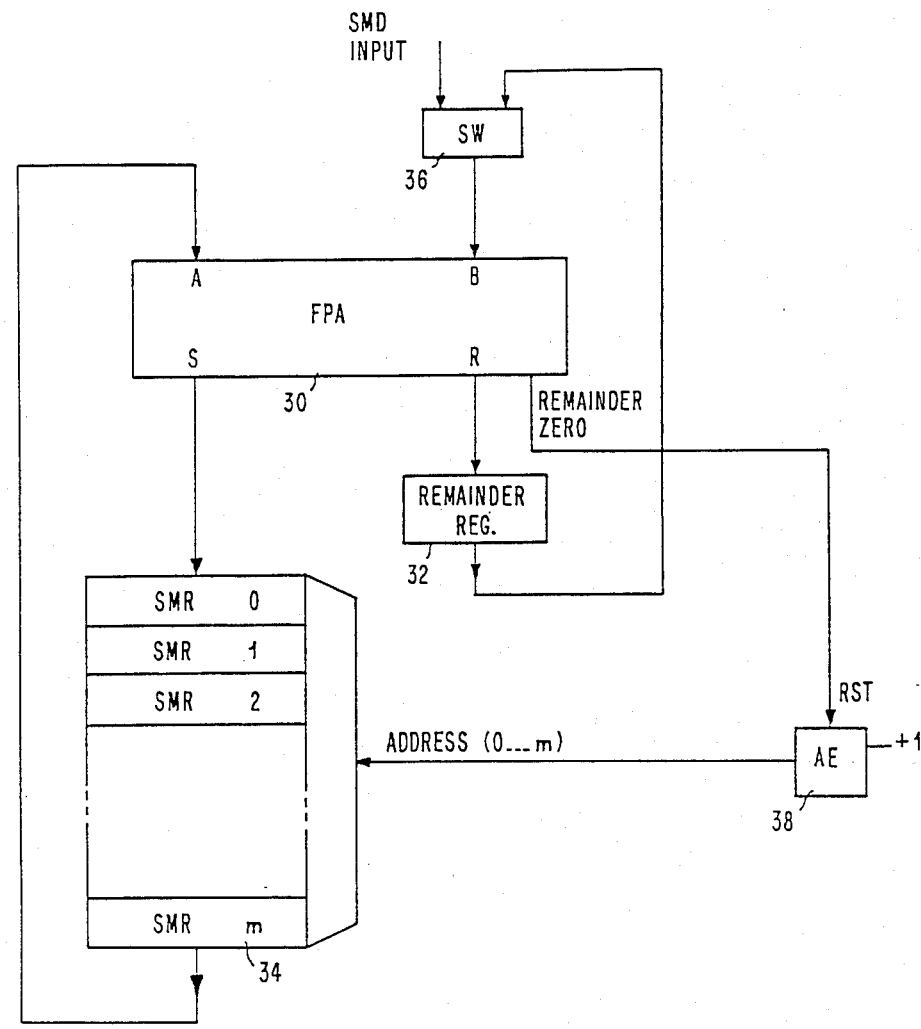
FIG. 8 shows a circuit arrangement with a single adder stage according to FIG. 2 for serial operation.

FIG. 8 shows an arrangement with a single adder circuit (FPA) 30, a remainder register 32 and a register stack 34 consisting of several sum registers SMR0-SMRm. Input B of the adder circuit may be connected by a changeover switch 36 to an operand input or the output of the remainder register. Upon receipt of an operand, this switch is reset, so that subsequently input B is connected to the output of the remainder register. The remainder register content is then successively added to the sum register content until finally the remainder register contains only zeros. Then the switch at input B is reset and a fresh operand is applied. After the operand has been received, the switch is reset and addition is repeated until the remainder register contains only zeros. After all operands have been applied, the exact result is available in the sum registers, while the remainder register contains only zeros. An example illustrated in FIG. 9 serves to explain this sequence in detail.

In this example, the operand values are the same as those used in FIG. 7. The significance of the individual table columns in partial FIGS. 9A and 9B is explained below.

The left-most column is designated as "main clock". At that time, switch 36 connects input B to the operand input, i.e., a fresh operand is applied.

The next column contains subclocks, if any, to the main clock. At a subclock, the content of remainder registers 32 is added to a storage register SMR. The address of the register concerned is indicated in the next column.

The next column indicates the value of the operand SMD applied to the operand input.

The next column contains the value of the operand applied to input B.

The next column contains the value of the operand applied to input A, which was read from the storage register SMR with the SMR address on the left.

The next column shows the sum of the two operands A and B.

The next column shows the content of the remainder register 32. If that content is zero, the next clock is a main clock, i.e., a fresh operand is applied from the operand input. The next two columns indicate the address of a storage register SMR and its content.

The last column denotes the respective computation step.

In computation step 1, the first operand 1,234E12 is applied to input B. Input A receives only zeros. Thus the sum corresponds to operand B and is stored in register SMR0.

As the content of the remainder register is zero, there is another main clock, i.e., the next operand, 2.345E9, is applied and added to register SMR 0. This addition produces a remainder 3.450E8 which is stored in remainder register 32. At this stage, a subclock has to be introduced which causes the content of the remainder register (at input B) to be added to the content of the next storage register (SMR 1). The latter content is zero, so that subsequently the remainder register SMR 1, too, stores only zeros. This reemphasizes how significant it is to detect a zero content in the remainder register and therefore FIG. 8 shows once more the respective output of the adder stage. The register stack may also comprise only few registers. Further registers may be added if after storage in the currently last register of the stack there is a remainder other than zero.

At the following main clock 3, operand 3.456E6 is applied and added to the content of SMR 0. The result is stored in SMR 0, and the remainder occurring must be added to the content of registers SMR 1 and SMR 2 at the subsequent subclocks.

In response to main clock 4, the last operand 4.567E3 is added to the content of register SMR 0. The resultant remainder is added to the content of registers SMR 1, SMR 2 and SMR 3 at the subsequent subclocks 4, 5 and 6.

In computation step 10, the content of the remainder register is zero and there is no further operand at the operand input, so that the final result is stored in register stack 34 or, more precisely, in registers SMR 0 to SMR 3.

In summary, if the content of the remainder register is zero, a fresh operand is applied and added (summed) to the content of the first storage register SMR0. At the subsequent subclocks, the respective content of the remainder register is successively added to the further storage registers until the content stored in the remainder register is zero. The number of subclocks per main clock is variable.

The example in FIG. 9 requires 10 computation steps for an accurate result.

In the example of FIG. 7, only 7 clocks are required. This is due to the fact that in FIG. 6 all adder stages operate simultaneously, as is clearly visible from FIG. 7, whereas in FIG. 8 there is a single adder stage, and the arithmetic operations required have to be performed successively. For addressing the storage 34, the respective address has to be incremented by 1. The address is reset to zero in response to a main clock, i.e., in response to a zero content stored in register 32.

FIG. 8 shows an address unit (38) which is provided with an address reset input RST which is connected to the "remainder zero" output of adder stage 30.

The chronological sequence at a main or a subclock is such that initially storage 34 is read and the data are transferred to adder stage 30, and that subsequently the operand input or the remainder register is fed to input B of adder stage 30 and the resulting sum and remainder signals are stored.

The exact sum determined by the method described is represented by a sequence of floating point numbers. Generally, at that stage the elements of this sequence are not yet ordered according to size, and the mantissas may be overlapping. If the described method is applied to the sequence of floating point numbers thus obtained, the result is an exact sum in which the elements are ordered and the mantissas are non-overlapping.

We claim:

1. A method for summing an input set of fixed word length summands consisting of sign, exponent and mantissa, wherein the smaller summand of two operand input summands of the input set is right-shifted for obtaining identical exponents, and mantissa addition is carried out in a floating point adder stage, said method comprising the following steps for obtaining an exact end sum:
    (a) generating a sum signal (sum) at the output of the adder stage and a smaller remainder signal (remainder) truncated from the smaller operand by right shifting, both in floating point notation,
    (b) adding a newly entered summand or a remainder of the sum,
    (c) repeatedly adding remainders to sums during and after the input of the various summands until the remainders have been cancelled and sums generated.

2. A method for summing an input set of fixed word length summands consisting of sign, exponent and mantissa (floating point operand), wherein the smaller summand of two operand input summands of the input set is right-shifted for obtaining identical exponents, and mantissa addition is carried out in a floating point adder stage, said method comprising the following steps for obtaining an exact end sum:
    (a) applying one of the input set summands at successive computation clocks to a first input (B input) of a first adder stage,
    (b) generating a sum signal (sum) at the output of the adder stage and a smaller remainder signal (remainder) truncated from the smaller operand by right shifting, both in floating point notation,
    (c) adding another one of the input set summands to the sum generated in that stage at the preceding clock and which sum is applied to a second input (A input),
    (d) transferring a remainder resulting from that addition to the first input of a subsequent adder stage and adding said remainder to a sum generated in that subsequent adder stage at the preceding clock,
    (e) transferring a remainder generated in the subsequent adder stage to the first input of a further adder stage,
    (f) retruncating a generated remainder in subsequent stages and retransferring said remainder,
    (g) adding the remainders to the sums in the individual adder stages after application of all summands until all remainders are zero, performing a floating point addition in steps (a) to (g) in all adder stages during a computation clock, the totality of the sums of the individual stages representing the final result.

3. A method for summing an input set of fixed work length summands consisting of sign, exponent and mantissa (floating point operand), wherein a plurality of sums and a remainder are buffered, and the smaller summand of two operand input summands of the input set is right-shifted for obtaining identical exponents, and mantissa addition is carried out in a floating point adder stage comprising the steps of (a) feeding a summand to a first input (B input) of an adder stage and adding said summand to a first sum applied to a second input (A input), (b) generating a sum signal (sum) at the output of the adder stage and a smaller remainder signal (remainder) truncated from the smaller operand by right shifting, both in floating point notation, (c) storing the generated remainder and storing the generated sum in place of the first sum, (d) adding the remainder to a second sum and storing the generating remainder in place of the previously stored remainder and storing the resulting sum in place of said second sum, (e) adding in further arithmetic operations the respective remainder stored to the next sum and replacing the stored values by newly generated values, (f) applying a new summand and executing step (a) after the remainder to be stored has become zero, (g) terminating the arithmetic operation after all summands have been applied and the remainder to be stored has become zero, the totality of the stored sums representing the final result.

4. The method of claim 3, wherein for storing the sums, a stack of storage registers is used, the number of storage registers which is kept variable by requesting a further register only if the remainder is other than zero and the last register of the stack has already been used.

5. The method of claim 4, wherein the storage registers are successively addressed using an address incremented by 1 after each computing clock, and said address is reset if the remainder is zero.

6. A circuit arrangement (floating point adder stage) comprising a first input (B input) and a second input (A input) for the floating point addition of two summands (A, B) consisting of sign, exponent and mantissa; a shift means (8) and a mantissa adder (10) for aligning and adding the two mantissas, and a post normalization means (12, 14, 16) for eliminating leading zeros of the mantissa sum, said adder stage also comprising a further shift means (18) for truncating the right-shifted remainder of the smaller summand (B''), which has not been added to the larger summand (A''), a post normalization means (20, 22, 24, 26) for normalizing the truncated remainder and for emitting a "remainder zero" signal, an output (S) for the sum of the two summands and an output (R) for the remainder with the same floating point notation at the output (S, R) of the circuit arrangement and at its input (A, B).

7. The circuit arrangement of claim 6, wherein the post normalization means comprises a detector (20) for determining the number of leading zeros of the remainder truncated by the further shift means (18) and for generating a shift value signal corresponding to the number of leading zeros, a third shift means (22) controlled by the detector for eliminating leading zeros, an adder (26) controlled by the detector for generating the exponent of the remainder, said detector also receiving the difference between the exponents of the two summand (A, B) as well as the exponent of the smaller summand (B'').

8. The circuit arrangement of claim 7, further comprising a gate circuit (24) for applying the least-significant digit of the sum of mantissas of the two summands emitted by the mantissa adder (10), the gate circuit being controlled by a carry signal of the mantissa adder and its output being connected to an input of the detector (20) and the third shift means (22).

9. The circuit arrangement of claim 7, wherein the detector (20) has an output for generating the "remainder zero" signal.

10. A circuit arrangement comprising a plurality of adder stages of claim 6 arranged in pipeline form, wherein the output R for the remainder of a stage is connected to the first input (B) of a subsequent stage, and the output (S) for the sum is connected to the second input of the stage in which it was computed such that newly resulting remainders are in each case transmitted to the next stage.

11. The circuit arrangement of claim 10, wherein, for buffering, the output of each stage is provided with one register for the sum and one register for the remainder.

12. The circuit arrangement with an adder stage according to claim 6, further comprising the following features:

the output (R) for the remainder is connected to a remainder register (32) and its output to a first input of a switch (36), a second input of the switch is connected to an input (SMD) for applying summands to be successively summed, the output of the switch is connected to the first input (B) of the adder stage, the input of a register stack (34) for buffering sum signals is connected to the output (S) for the sum, and the output of the stack is connected to the second input (A) of the adder stage, the stack is addressed by an address means (38) with successive addresses.

13. The circuit arrangement of claim 12, wherein said address means (38) comprises a reset input (RST) which is connected to the "remainder zero" output of the adder stage.

* * * * *